(12) United States Patent
Huhn (10) Patent No.: US 9,586,638 B2
(45) Date of Patent: Mar. 7, 2017

(54) PRODUCING A VEHICLE BODY (71) Applicant: Ford Global Technologies, LLC, Dearborn, MI (US)

(72) Inventor: Henrik Martin Huhn, Düsseldorf/Nordrhein-Westfalen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/476,022

(22) Filed: Sep. 3, 2014

(65) Prior Publication Data
US 2015/0084378 A1    Mar. 26, 2015

(30) Foreign Application Priority Data
Sep. 25, 2013   (DE) ......................... 10 2013 219 315

(51) Int. Cl.
*B62D 65/06* (2006.01)
*B62D 25/06* (2006.01)
*B62D 27/02* (2006.01)
*B62D 25/02* (2006.01)
*B21D 39/02* (2006.01)
*B21D 53/88* (2006.01)

(52) U.S. Cl.
CPC ........... *B62D 65/06* (2013.01); *B21D 39/021* (2013.01); *B21D 53/88* (2013.01); *B62D 25/02* (2013.01); *B62D 25/06* (2013.01); *B62D 27/02* (2013.01); *B62D 27/026* (2013.01); *Y10T 29/49622* (2015.01)

(58) Field of Classification Search
CPC ...... B62D 25/06; B62D 25/07; B62D 27/023; B62D 27/026

USPC .................................................... 296/210, 29
See application file for complete search history.

(56) References Cited

U.S. PATENT DOCUMENTS

| | | | |
|---|---|---|---|
| 3,239,269 A | 3/1966 | Wilfert et al. | |
| 3,815,307 A * | 6/1974 | Tantlinger | B62D 31/02 296/178 |
| 4,950,348 A * | 8/1990 | Larsen | F16B 11/006 156/274.8 |
| 5,795,014 A | 8/1998 | Balgaard | |
| 6,696,147 B1 * | 2/2004 | Herring, Jr. | B21D 39/021 428/323 |
| 7,115,322 B2 * | 10/2006 | Curtiss | B60J 5/0469 29/513 |

(Continued)

FOREIGN PATENT DOCUMENTS

EP    0898540    3/1999

*Primary Examiner* — Jason S Morrow
(74) *Attorney, Agent, or Firm* — Jason C. Rogers; Bejin Bieneman PLC (57) ABSTRACT

A method for producing a vehicle body with a roof part, lateral roof frame parts, a roof channel provided between said components on each side of the roof, and also front and rear roof-structure transverse parts, obtains a simpler and more cost-effective connection of the roof part to the adjacent components, while avoiding disadvantages associated with thermal connections. The roof part and the lateral roof frame parts are fixedly connected to one another at least along the respective roof channel by beading/seaming. The same also applies to the connection of the roof part to the front and rear roof-structure transverse parts. The beading/seaming can additionally be combined with an adhesive or an adhesive tape.

19 Claims, 9 Drawing Sheets

(56) References Cited

U.S. PATENT DOCUMENTS

| | | | | |
|---|---|---|---|---|
| 8,636,197 B1* | 1/2014 | Hill | B23K 11/115 | 156/60 |
| 2010/0291310 A1* | 11/2010 | Hartmann | B25J 15/0052 | 427/427.3 |
| 2010/0314911 A1* | 12/2010 | Morgans | B62D 25/06 | 296/203.03 |
| 2010/0327620 A1* | 12/2010 | Shah | B62D 25/06 | 296/102 |
| 2011/0170946 A1* | 7/2011 | Schneegans | B21D 39/021 | 403/271 |
| 2011/0271728 A1* | 11/2011 | Vanimisetti | B21D 39/021 | 72/46 |
| 2012/0061998 A1* | 3/2012 | Carsley | B62D 25/06 | 296/210 |
| 2013/0104614 A1* | 5/2013 | Foster | B21D 39/023 | 72/51 |
| 2014/0255088 A1* | 9/2014 | Drazic | B62D 27/026 | 403/267 |
| 2015/0121984 A1* | 5/2015 | Yoshimichi | B21D 19/043 | 72/252.5 |
| 2015/0158282 A1* | 6/2015 | Morral | B21D 39/021 | 156/79 |

* cited by examiner

PRODUCING A VEHICLE BODY

CROSS REFERENCE TO RELATED APPLICATIONS

This application claims priority to German Patent Application No. DE 102013219315.7, filed on Sep. 25, 2013, the entire contents of which are incorporated herein in their entirety for all purposes.

BACKGROUND

In vehicle body shell construction, when joining the roof part to corresponding connection parts, thermal joining methods are generally used, such as, for example, resistance spot welding, laser welding or laser soldering.

During joining by resistance spot welding, a design may result in multi-sheet layers that are no longer weldable. In particular, the multi-sheet connection of thin sheets to thicker reinforcements constitutes a difficulty for resistance spot welding. Nevertheless, to be able to carry out the joining, one or more sheets have to be notched, as a result of which the vehicle structure is locally weakened.

In addition, a high level of investment is required for alternatives of laser welding or laser soldering.

Also, when using thermal joining methods, it is not readily possible to combine different materials, such as, for example, aluminum with steel or the connection to suitable plastics, for example CFRP materials.

According to the known prior art (U.S. Pat. No. 3,239,269), it is already being attempted to provide seamed connections at a number of points between the roof part and the adjacent components, but the main connections still always have to be produced by means of thermal joining methods.

SUMMARY

The presently disclosed subject matters provides for obtaining a simpler and more cost-effective connection of a roof part to adjacent components. Disadvantages associated with the thermal connections are thereby avoided.

The disclosure includes producing a vehicle body with a roof part, lateral roof frame parts, a roof channel provided between said two components on each side of the roof, and also front and rear roof-structure transverse parts. Accordingly, the roof part and the roof frame are connected fixedly to each other at least along a respective roof channel by beading/seaming.

In the same manner, the roof part and the roof-structure transverse parts can also be connected fixedly to one another by beading/seaming.

It is thereby possible to fasten the roof part to the adjacent components in a relatively simple manner. The connection can also be assisted by the beading/seaming being combined with an adhesive or an adhesive tape, as a result of which a strength of the construction can be increased even further and, in particular, absolute tightness can be obtained.

Although seaming techniques are already used in tilt and slide roof openings (U.S. Pat. No. 5,795,014 A and EP 0 898 540 B1), spot welds are also required here at least in some regions of the roof openings.

Considerable advantages are opened up for body manufacturing by the exclusive use of the beading/seaming technique, preferably combined with an adhesive bonding technique.

For example, advantages flow from the fact that the roof part is adequately fixedly connected to the body by the beading/seaming to allow the cleaning and painting process to be undertaken. Furthermore, depending on the design of the individual components, this type of connection permits thermally induced relative movements in the expansion direction during the furnace process without flanges lifting off one another. This is important in particular when adhesive is used.

A further advantage of the disclosed subject matter can be seen in the fact that the disclosed type of connection permits a mixed construction of the body, namely the use of different materials for the roof part and the remaining components of the body. Thus, certain components can be manufactured from aluminum, while other components are composed of steel sheet. Furthermore, for example, the roof part can be manufactured from a suitable plastic, for example CFRP material, or from sandwich material, wherein this material generally has a greater thickness than the sheets of the adjacent components. By the beading/seaming technique, the connection does not cause any difficulties for parts which differ in thickness and may be composed of different materials.

The joining technique by beading/seaming, to connect the individual components fixedly to one another, can take place in various ways, with a combination including an adhesive or an adhesive tape being one example.

An exemplary embodiment includes a raised flange extending at least in sections over the entire length of the joining point mounted on at least one of the components, and, after the roof part is placed onto the roof frame, the flange is deformed with the aid of a beading tool in such a manner that a positive-locking, fixed connection to the adjacent component arises, wherein a combination with an adhesive or an adhesive tape increases the strength further and leads to improved tightness of the connecting points.

If the roof part is intended to be connected to the adjacent roof frame parts, which have an inner part, a side part and a reinforcing part arranged between said components, the flange can be mounted on that region of the side part which faces the respective roof channel, while the flange extends at least in sections over the roof channel and, after the roof part is placed onto the roof frame parts, is beaded/seamed over the edge of the roof part by use of a beading tool.

As an alternative, the connection can also be undertaken in such a way that a flange is mounted, at least in sections, both on the side part of the roof frame and on the roof part, the flange provided on the side part being directed obliquely upward and the flange provided on the roof part being directed obliquely downward. Thus, when the roof part is placed onto the roof frame, the flanges are oriented with respect to one another so as to intermesh, and, after the roof part is placed onto the roof frame, the flanges are compressed in a positive-locking manner by means of a beading tool.

As an alternative, the connection can also take place in that a flange is provided, at least in sections, both on the side part of the roof frame and on the roof part, the two flanges being directed upward and one of the two flanges being designed to be longer than the other flange. Thus, when the roof part is placed onto the roof frame, the two flanges are oriented with respect to each other in such a manner that they bear directly against each other, and, after the roof part is placed onto the roof frame, the longer flange is beaded/seamed over the shorter flange.

Finally, it is also possible that a flange is mounted, at least in sections, both on the side part of the roof frame and on the roof part, the two flanges being directed upward and being designed to be approximately identical in length. Thus, when the roof part is placed onto the roof frame, the two flanges are oriented with respect to each other such that they bear directly against each other, and such that, after the roof part is placed onto the roof frame, the two flanges are beaded/seamed together to form one side. This flange can be used, for example, for fastening a roof strip to the roof channel covering.

To connect the roof part to the front roof-structure transverse part or to the front head rail, the front end of the latter can have a flat edge, while the front end of the roof part is provided with a flange that, after the roof part is placed on the vehicle body, the roof part covering the front head rail is beaded/seamed around the flat edge of the head rail.

As an alternative, the front end of the front head rail can be provided with a flange which, after the roof part is placed on the vehicle body, the roof part covering the front head rail is beaded/seamed around the front edge of the roof part.

To connect the roof part to the rear roof-structure transverse part or to the rear head rail, an upwardly directed flange can be integrally formed at the rear end thereof, while an approximately horizontally running flange is formed at the rear end of the roof part. In this configuration, after the roof part is placed on the vehicle body, the roof part covering the rear head rail, the horizontal flange of the roof part can be beaded/seamed around the upwardly directed flange of the rear head rail.

As an alternative, an upwardly directed flange can be formed at the rear end of the roof part, while a likewise upwardly directed flange is integrally formed at the rear end of the rear roof rail but said flange is longer than the flange formed on the roof part. After the roof part is placed onto the head rail, said flange of the rear head rail can be beaded/seamed around the flange of the roof part.

The claimed invention is illustrated by way of example in the drawings and is described in detail below with reference to the drawings, in which:

FIG. 15: shows a top view of the vehicle body according to FIG. 1, FIG. 16: shows, in an enlarged illustration, a section along the line XI-XI from FIG. 15, FIG. 17: shows, in an enlarged illustration, a section along the line XVII-XVII from FIG. 15, FIG. 18: shows, in an enlarged illustration, a connection between roof part and front head rail before the roof part is placed on the vehicle body.

Figure 1:
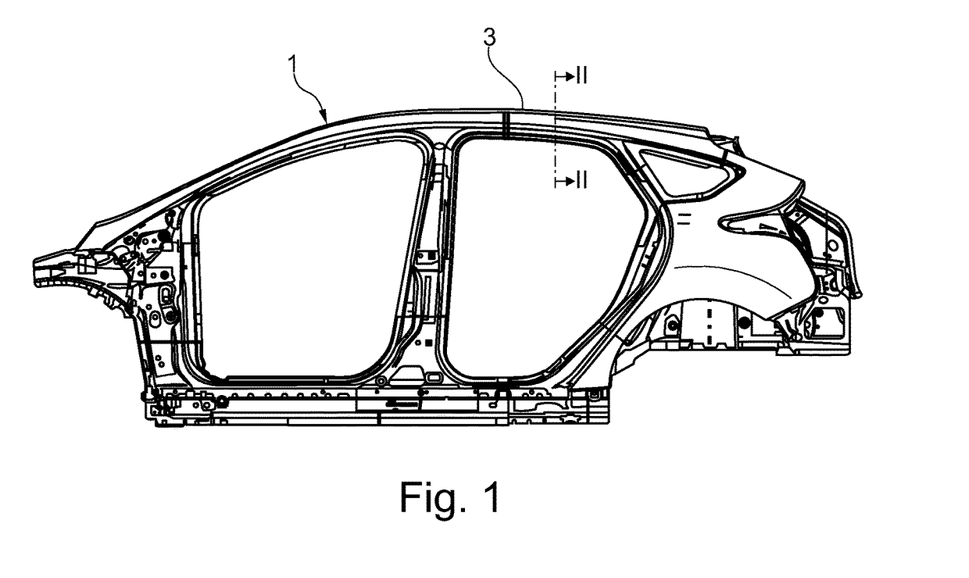
FIG. 1: shows a side view of a vehicle body.

The side view of a vehicle body 1 is illustrated in FIG. 1 of the drawing.

Figure 2:
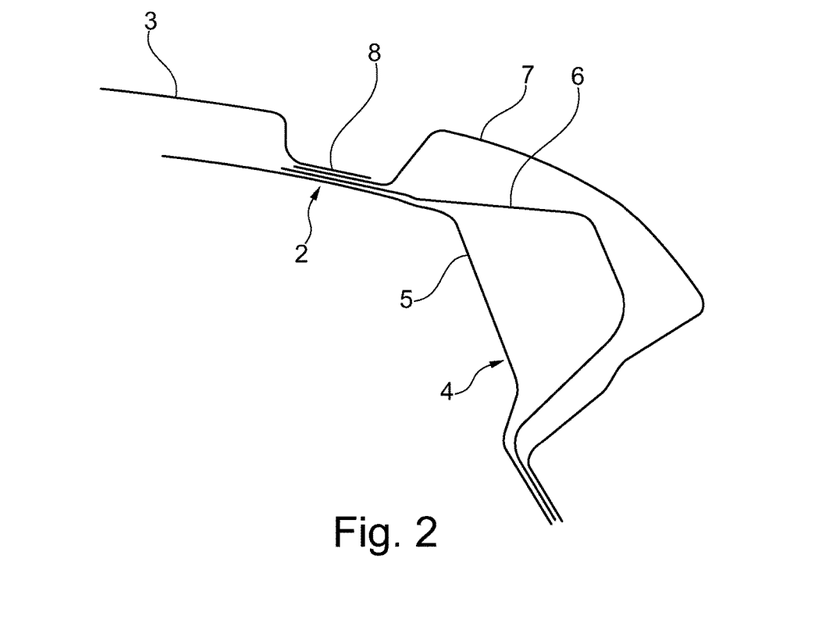
FIG. 2: shows, in a schematic and enlarged illustration, a section along the line II-II from FIG. 1 with a conventional joining point.

Disclosed herein is connection of individual body parts in the region of a joining part 2 which as illustrated in FIG. 2, is designed in a conventional manner, and is arranged in a region of the roof channel 8 and in which a roof part 3 is connected to a roof frame 4.

Figure 3:
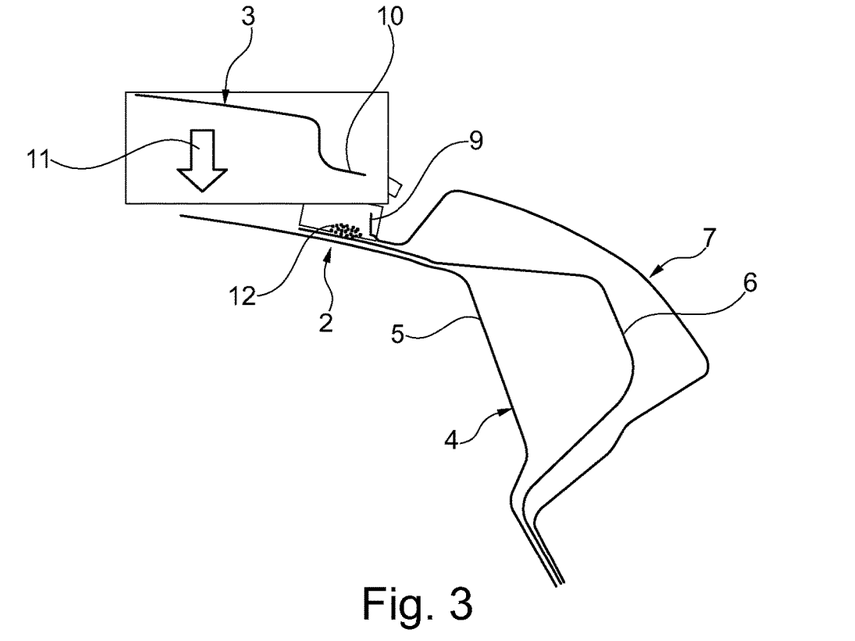
FIG. 3: shows the same section as FIG. 2 with a joining point according to a first embodiment before the roof part is placed on the vehicle body.
Figure 4:
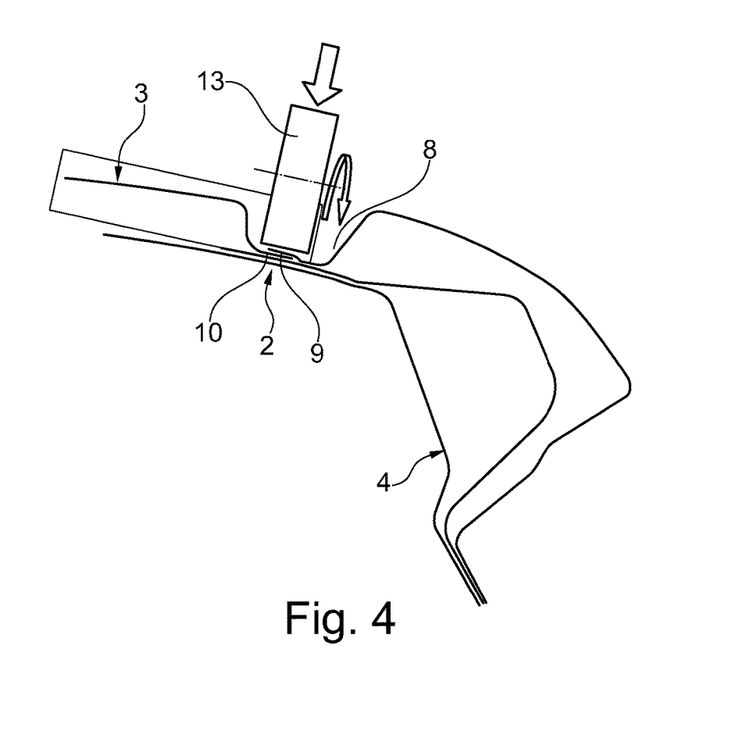
FIG. 4: shows the same section as FIG. 3 with the roof part placed on the vehicle body and with the use of a beading tool.

According to an exemplary embodiment that is illustrated in FIGS. 3 and 4, the joining point 2 shown in FIG. 2 is improved. The roof frame 4 here comprises an inner part 5, a reinforcing part 6 and a side part 7. The side part 7 is provided on the side facing the roof part 3 with a raised beading flange 9 extending over the entire length of the joining point 2. The roof part 3 has an offset roof flange 10 on an adjacent edge.

The roof part 3 is offset on the roof frame 4 directly in front of the beading flange 9 of the side part 7 in the direction of the arrow 11 illustrated in FIG. 3. An adhesive layer 12 is applied to the roof frame 4 in this region. If the roof part 3 takes up the placed-on position that is illustrated in FIG. 4, the beading flange 9 provided on the side part 7 is rolled over the roof flange 10 with the aid of a beading tool, for example a pressing roller 13, such that a fixed and tight joining point 2 is produced in the region of the roof channel 8.

Figure 5:
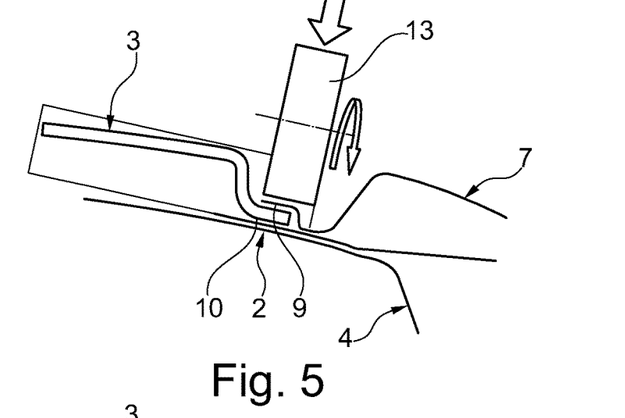
FIG. 5: shows the same section as FIG. 4 with a roof part which has a greater wall thickness.

Components of a different material and differing wall thickness can also be joined together by the steps illustrated in FIGS. 3 and 4. An exemplary embodiment in this regard is illustrated in FIG. 5, in which the roof part 3 has a relatively thick wall thickness. The beading flange 9 provided on the side part 7 of the roof frame 4 can easily be seamed over the roof flange 10 with the aid of the pressing roller 13, with the material of the roof part 3 and the thickness of the roof flange 10 not being important.

Figure 6:
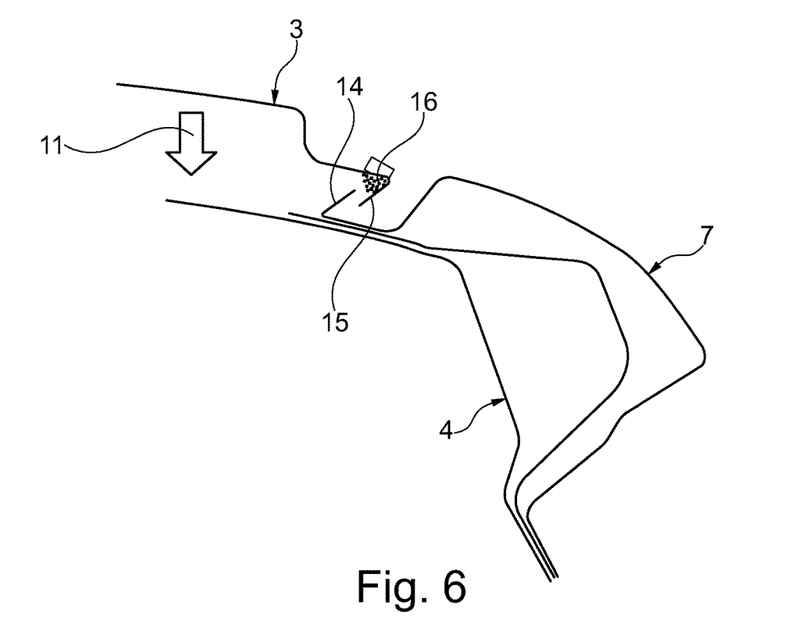
FIG. 6: shows the same illustration as in FIG. 3 of another embodiment of the beaded or seamed connection before the roof part is placed on, FIG. 7: shows the same section as FIG. 6 after the roof part is placed on and a beading tool has been used.
Figure 7:
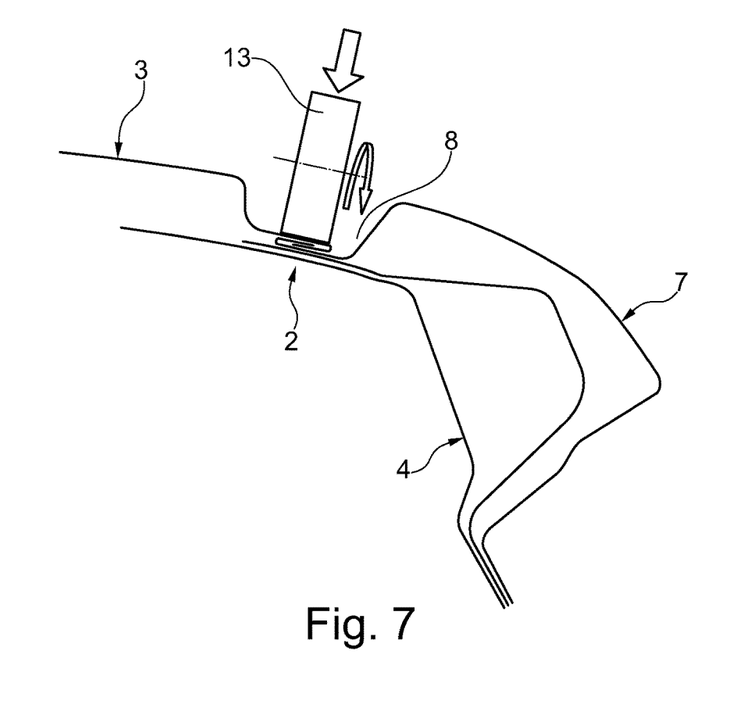

FIGS. 6 and 7 illustrate a further exemplary embodiment of a joining method. In this exemplary embodiment, an obliquely upwardly directed flange 14 is formed on the side part 7 and an obliquely downwardly directed flange 15 is formed on the roof part 3. An amount of adhesive 16 is provided behind the flange 15 of the roof part 3. When the roof part 3 is placed onto the roof frame 4, the two flanges 14 and 15, which are aligned with respect to each other, intermesh and are then, as illustrated in FIG. 7, pressed together in a positive-locking manner with the aid of a pressing roller 13. By use of this joining method, combined with an adhesive point, a fixed and tight connection is produced between the roof frame 4 and the roof part 3.

Figure 8:
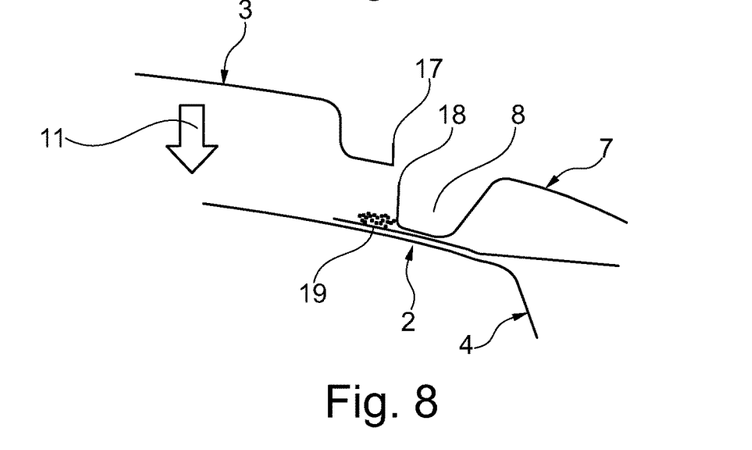
FIG. 8: shows the same illustration as FIGS. 3 and 6 of a further embodiment of the beaded or seamed connection before the roof is placed on the vehicle body.
Figure 9:
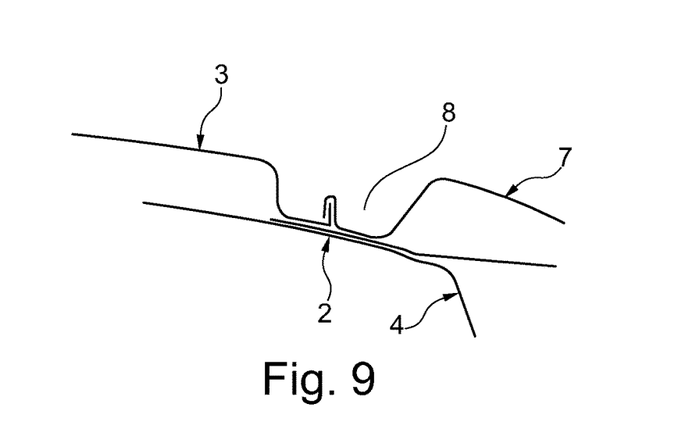
FIG. 9: shows the same illustration as in FIG. 8 after the roof is placed on the vehicle body and after the beaded or seamed connection is provided.

FIGS. 8 and 9 illustrate a further exemplary embodiment of the disclosed joining method. In this exemplary embodiment, an upwardly directed flange 17 is provided on the roof part 3 in a region of the roof channel 8, and an upwardly directed flange 18 is provided on the side part 7 of the roof frame 4. The flange 18 formed on the side part 7 is designed to be longer in this embodiment than the flange 17 of the roof part 3. When the roof part 3 is lowered onto the roof frame 4 in the direction of the arrow 11, the two flanges 17 and 18 are aligned with each other in such a manner that they bear against each other. When the offset position of the roof part 3 on the roof frame 4 is reached, the longer flange 18, which is formed on the side part 7, is beaded over the shorter flange 17, which is provided on the roof part 3, by a suitable beading tool, as illustrated in FIG. 9. The joining point 2 produced in this embodiment in the region of the roof channel 8 is of fixed design. In addition to the seaming, an adhesive point 19 is also provided, specifically directly under the edge of the roof part 3 upstream of the flange 18, when said roof part is placed onto the roof frame 4, and therefore sufficient tightness of the joining region is ensured.

Figure 10:
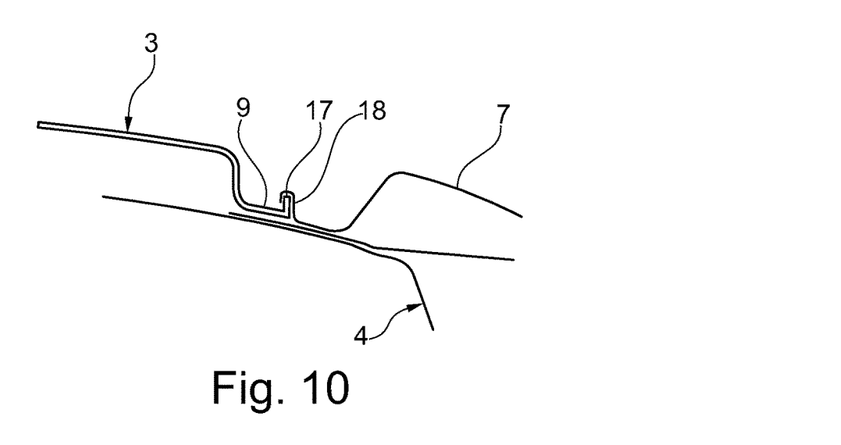
FIG. 10: shows a similar illustration as FIG. 9, but wherein the roof part has a greater wall thickness in the same manner as in FIG. 5, FIG. 11: shows a similar illustration as in FIG. 9 in a different embodiment.

In FIG. 10, the principle illustrated in FIGS. 8 and 9 is transferred to a roof part 3 which, as in FIG. 5, has a greater wall thickness. In this exemplary embodiment, in the same manner as in the exemplary embodiment illustrated in FIGS. 8 and 9, the roof part 3 is provided at the outer end of the beading flange 9 with an upwardly directed flange 17 around which the upwardly directed flange 18 of the side part 7 is beaded in order to obtain a fixed seat.

Figure 11:
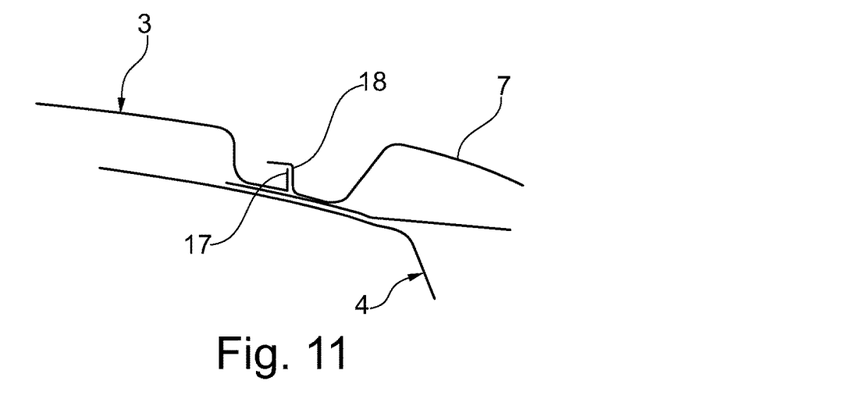

The exemplary embodiment illustrated in FIG. 11 is a variant according to FIG. 9, wherein the flange 18 of the side part 7 is only partially beaded around the upwardly directed flange 17 of the roof part 3. The tightness and strength of the connection are substantially realized by an amount of adhesive being introduced.

Figure 12:
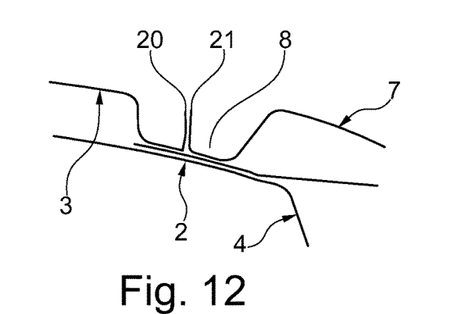
FIG. 12: shows a further embodiment of the beaded or seamed connection after the roof is placed on the vehicle body, but before the connection is provided.
Figure 13:
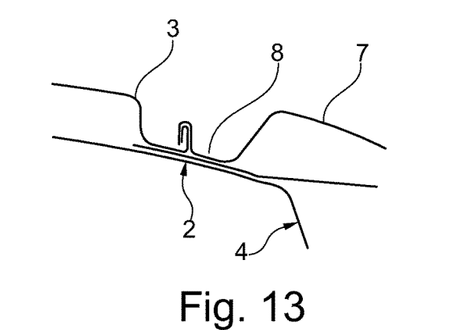
FIG. 13: shows the same section as FIG. 12 after the beaded or seamed connection is formed.

A further exemplary embodiment of a highly effective joining point 2 is illustrated in FIGS. 12 and 13. In FIG. 12, the roof part 3 is illustrated already in the offset position thereof on the roof frame 4. In this exemplary embodiment, an upwardly directed flange 20 is formed on the roof part 3 and an upwardly directed flange 21 is also formed on the side part 7 of the roof frame 4. The two flanges 20 and 21 which are approximately identical in length and, after the roof part 3 is placed onto the roof frame 4, bear directly against each other are then beaded or seamed toward one side by means of a suitable beading tool. As a result, a fixed and tight connection between the roof part 3 and the roof frame 4 is also produced in this exemplary embodiment, which can also be combined with an adhesive point, in the region of the roof channel 8.

Figure 14:
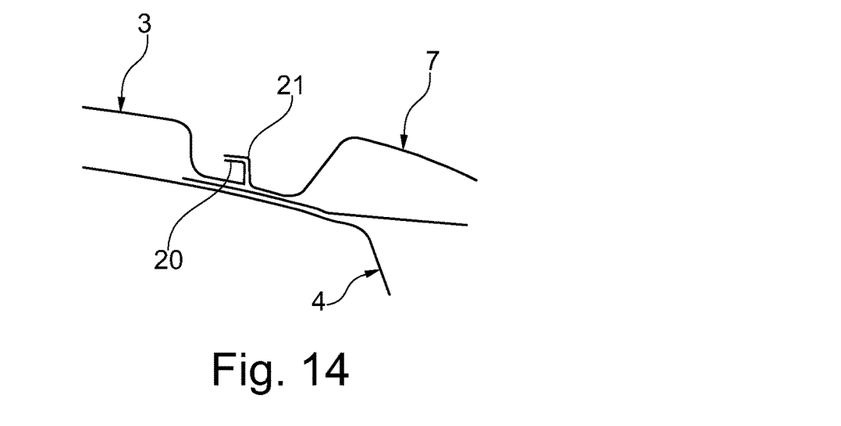
FIG. 14: shows the same illustration as in FIG. 13 as a further embodiment.

FIG. 14 illustrates a variant of the exemplary embodiment according to FIGS. 12 and 13, in which the flanges 20 and 21 are bent over merely by 90°. The strength of the connection is also obtained in this exemplary embodiment by an amount of adhesive being introduced.

Figure 15:
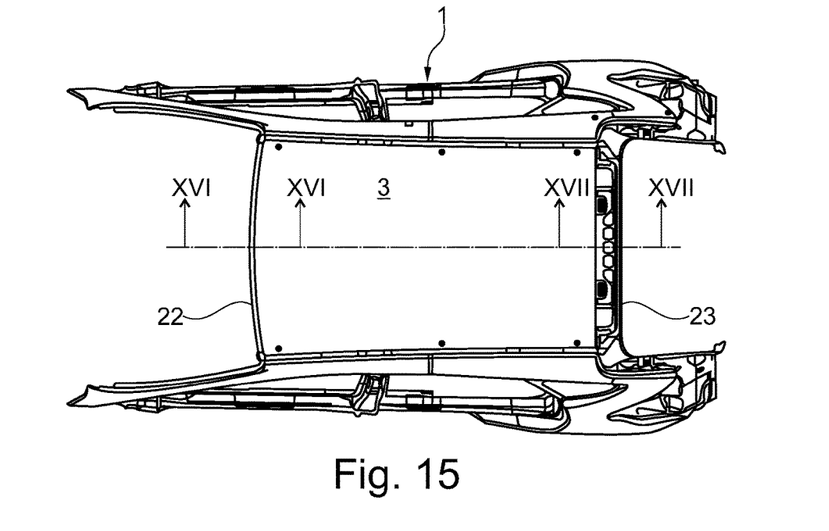

FIG. 15 illustrates a top view of the vehicle body 1 illustrated in FIG. 1.

Figure 16:
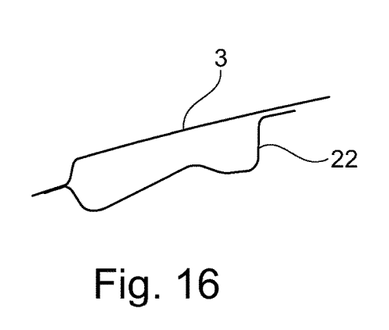
Figure 17:
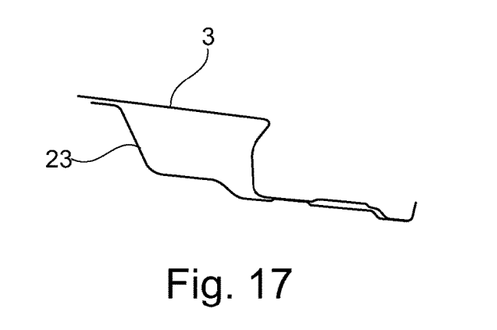

The sections which are illustrated on an enlarged scale in FIGS. 16 and 17 illustrate the connections between the roof part 3 and the front and rear roof-structure transverse parts, namely the front head rail 22 and the rear head rail 23.

FIGS. 18 to 21 show two exemplary embodiments of how the roof part 3 is connected to the front head rail 22.

Figure 18:
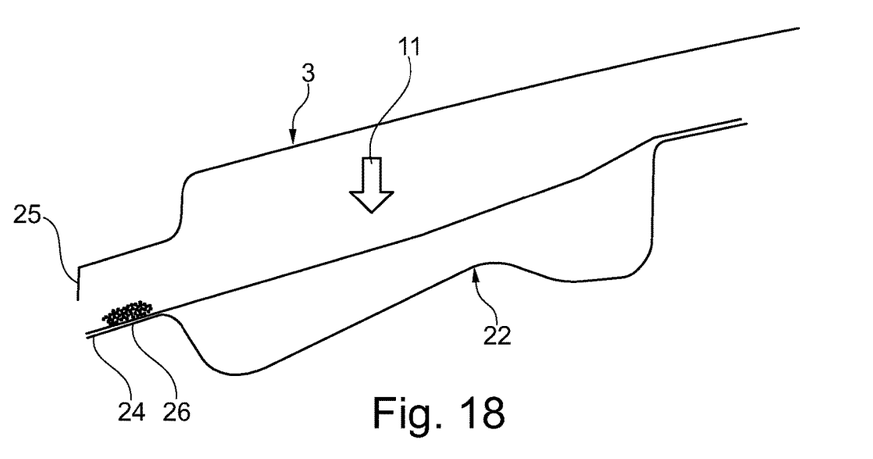
Figure 19:
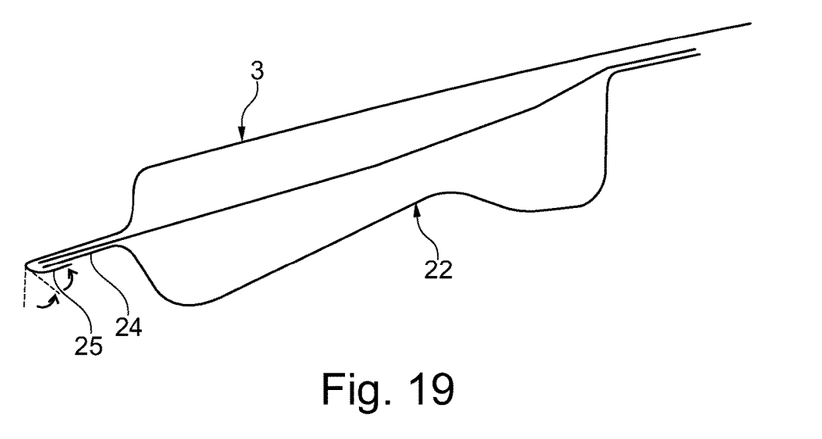
FIG. 19: shows the same section as FIG. 18 after the roof part is placed on the vehicle body and the beaded or seamed connection is provided.

In the exemplary embodiment illustrated in FIGS. 18 and 19, the front end of the front head rail 22 is provided with a flat edge 24, while the front end of the roof part 3 has a downwardly directed flange 25. When the roof part 3 is placed onto the front head rail 22 in the direction of the arrow 11, the downwardly directed flange 25 of the roof part 3 engages over the edge 24 of the front head rail 22 and is subsequently beaded around the edge 24 of the head rail 22 by means of a suitable beading tool, as illustrated in FIG. 19. An adhesive layer 26, which is illustrated in FIG. 18, is provided between the upper side of the flat edge 24 provided on the head rail 22 and the corresponding region of the roof part 3, the adhesive layer together with the beaded edge 24 forming a tight and fixed seat between the roof part 3 and the front edge of the front head rail 22.

Figure 20:
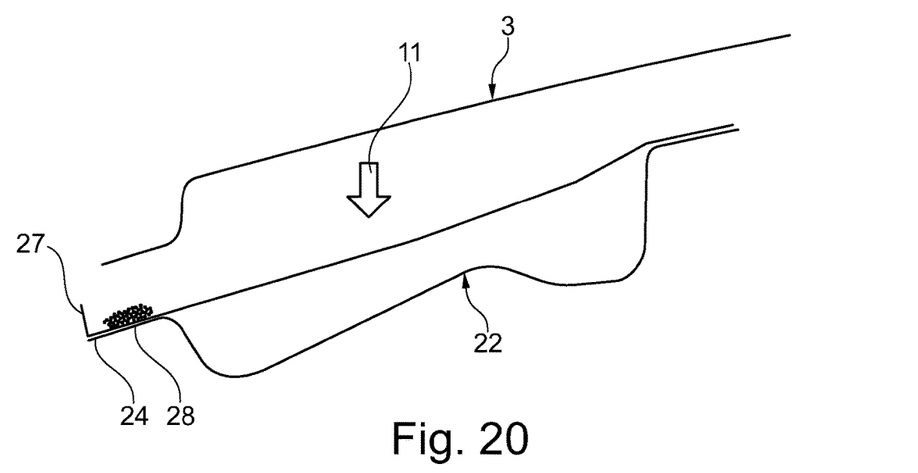
FIG. 20: shows the same section as FIG. 18 of a different embodiment of the beaded or seamed connection before the roof part is placed on the vehicle body.
Figure 21:
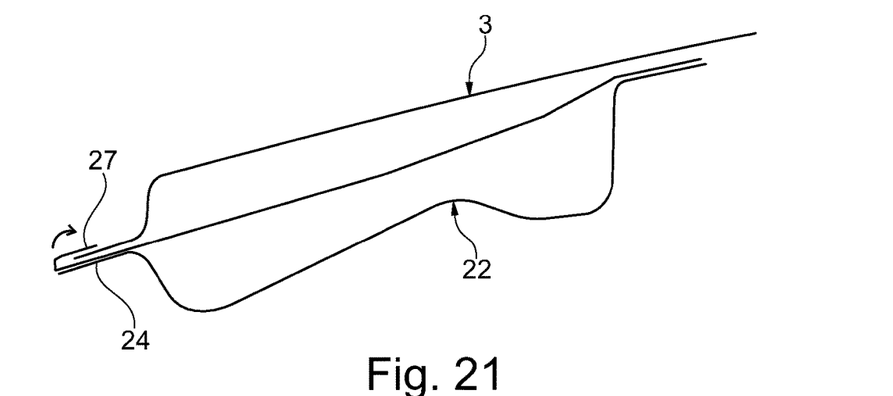
FIG. 21: shows the same section as FIG. 20 after the roof part is placed on the vehicle body and the beaded or seamed connection is provided.

In the exemplary embodiment illustrated in FIGS. 20 and 21, an upwardly directed flange 27 is provided on the flat edge 24 of the front head rail 22, which flange, when the roof part 3 is lowered onto the front head rail 22 in the direction of the arrow 11, is beaded around the front edge of the roof part 3, as illustrated in FIG. 21. An adhesive layer 28 can be provided in turn between the front edge 24 of the head rail 22 and the directly adjacent lower side of the roof part 3. A fixed and tight connection between the front head rail 22 and the roof part 3 is therefore produced by the seaming in combination with the adhesive layer.

Figure 22:
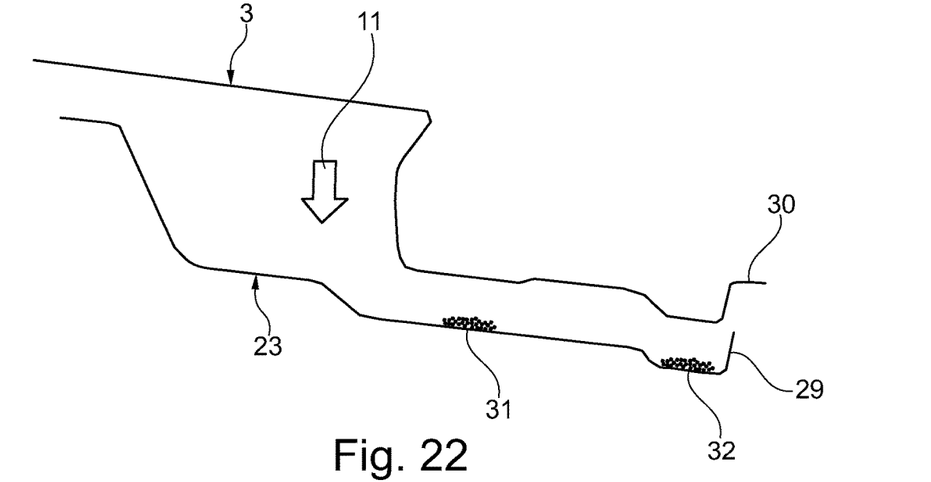
FIG. 22: shows, in an enlarged illustration, a section through a connection of the roof part to the rear head rail before the roof part is placed on the vehicle body.
Figure 23:
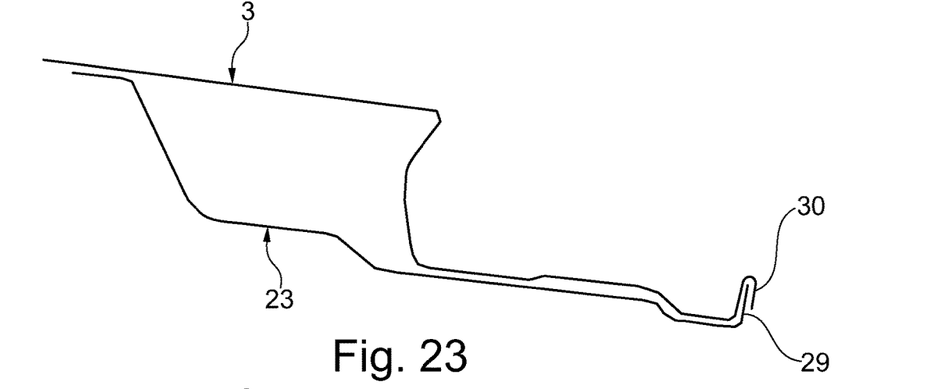
FIG. 23: shows the same section as FIG. 22 after the roof part is placed on the vehicle body and the beaded or seamed connection is provided.

FIGS. 22 and 23 show an exemplary embodiment of a connection between the roof part 3 and the rear head rail 23. In this exemplary embodiment, an upwardly directed flange 29 is integrally formed at the rear end of the head rail 23. An approximately horizontally running flange 30 is formed at the rear end of the roof part 3. If the roof part 3 is lowered in the direction of the arrow 11 into the position illustrated in FIG. 23 and rests on the rear head rail 23, the horizontal flange 30 of the roof part 3 is beaded or seamed around the upwardly directed flange 29 of the rear head rail 23. Adhesive layers 31 and 32 or adhesive tapes can be applied in regions in which the roof part 3 rests tightly on the upper side of the rear head rail 23.

Figure 24:
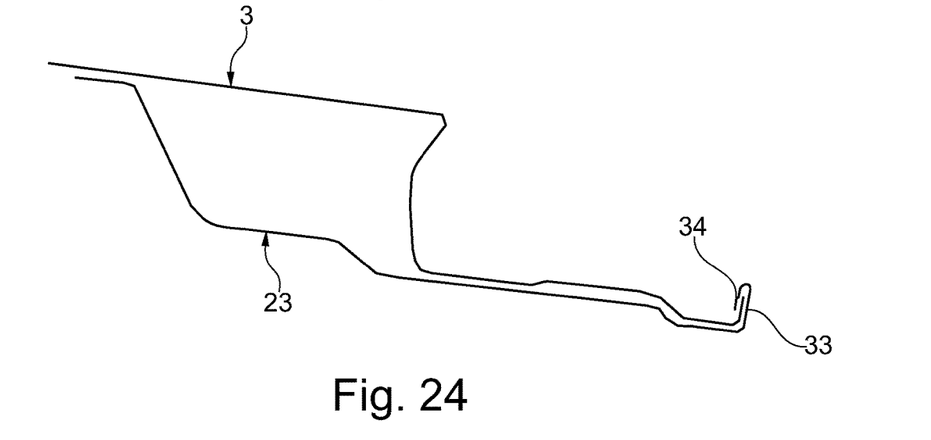
FIG. 24: shows the same section as FIG. 23 of a further embodiment of the beaded or seamed connection.

In the exemplary embodiment illustrated in FIG. 24, an upwardly directed flange 33 is formed at the rear end of the roof part 3, while an upwardly directed flange 34 is likewise integrally formed at the rear end of the rear head rail 23, wherein the flange 34 of the rear head rail 23 is longer than the flange 33 formed on the roof part 3, and therefore, after the roof part 3 is placed onto the rear head rail 23, the flange 34 of the rear head rail 23 can be beaded or seamed around the flange 33 of the roof part 3.

The invention claimed is:

1. A method for producing a vehicle body that includes a rigid and bendable roof part, lateral roof frame parts, a roof channel provided between the roof part and the lateral roof frame parts on each of two sides of the roof part, and also front and rear roof-structure transverse parts, the method comprising:

fixedly connecting the roof part and the lateral roof frame parts to one another at least along the respective roof channel by at least one of beading and seaming that includes bending one of the parts over the other;
wherein the roof part is substantially free of welds.

2. The method of claim 1, further comprising fixedly connecting the roof part and the front and rear roof-structure transverse parts to one another by at least one of beading and seaming.

3. The method of claim 1, wherein the at least one of beading and seaming is combined with one of an adhesive and an adhesive tape.

4. The method of one of claim 1, wherein:
a raised flange extending at least in sections over a length of a joining point is mounted on at least one of the roof part and the lateral roof frame parts, and
following placement of the roof part on the roof frame, the flange is deformed using a beading tool such that a positive-locking, fixed connection to the adjacent component is created.

5. The method of claim 1, the roof frame parts each having an inner part, a side part and a reinforcing part arranged between the roof part and the lateral roof frame parts, wherein:
a flange is mounted on a region of the side part that faces the respective roof channel, wherein the flange extends at least in sections over the roof channel, and
following placement of the roof part on the roof frame parts, the flange is at least one of beaded and seamed over an edge of the roof part.

6. The method of claim 1, further comprising:
mounting flanges both on the side part of the roof frame and on the roof part, a flange provided on the side part being directed obliquely upward and a flange provided on the roof part being directed obliquely downward; wherein
when the roof part is placed onto the roof frame, the flanges are oriented with respect to one another so as to intermesh, and
following placement of the roof part on the roof frame parts, the flanges are compressed in a positive-locking manner by using a beading tool.

7. The method of claim 1, wherein two flanges are provided, one flange on a side of the roof frame and one flange on the roof part, the flanges being directed upward and one of the flanges being designed to be longer than the other flange, wherein, when the roof part is placed onto the roof frame, the flanges are oriented with respect to each other in such a manner that they bear against each other, and wherein, after the roof part is placed onto the roof frame, the longer flange is at least one of beaded and seamed over the shorter flange.

8. The method of claim 1,
wherein two flanges are mounted, one flange on a side of the roof frame and one flange on the roof part, the two flanges being directed upward and being approximately identical in length;
wherein, when the roof part is placed onto the roof frame, the two flanges are oriented with respect to each other in such a manner that they bear against each other; and
wherein, after the roof part is placed onto the roof frame, the two flanges are at least one of beaded and seamed together to form one side.

9. The method of claim 1, wherein:
the front roof-structure transverse part is a front head rail;
a front end of the front head rail has a flat edge;
a front end of the roof part is provided with a downwardly directed flange, and
following placement of the roof part on the roof frame, with the roof part covering the front head rail, the flange is at least one of beaded and seamed around the flat edge of the head rail.

10. The method of claim 1, wherein:
the front roof-structure transverse part is a front head rail;
a front end of the front head rail is provided with an upwardly directed flange; and
following placement of the roof part on the roof frame, with the roof part covering the front head rail, the flange is at least one of beaded and seamed around the front edge of the roof part.

11. The method of claim 1, wherein:
the front roof-structure transverse part is a rear head rail;
an upwardly directed flange is integrally formed at a rear end of the rear head rail;
an approximately horizontally running flange is formed at the rear end of the roof part; and
following placement of the roof part on the roof frame, with the roof part covering the rear head rail, the horizontal flange of the roof part is at least one of beaded and seamed around the upwardly directed flange of the rear head rail.

12. The method of claim 1, wherein:
the front roof-structure transverse part is a rear head rail;
an upwardly directed flange is formed at a rear end of the roof part;
a likewise upwardly directed flange is integrally formed at a rear end of the rear head rail, said flange being longer than the flange formed on the roof part; and
following placement of the roof part on the roof frame, the flange of the rear head rail is at least one of beaded and seamed around the flange of the roof part.

13. A vehicle body, comprising a rigid and bendable roof part, lateral roof frame parts, a roof channel provided between the roof part and the lateral roof frame parts on each of two sides of the roof part, and also front and rear roof-structure transverse parts, wherein the roof part and the lateral roof frame parts are fixedly connected to one another at least along the roof channel by at least one of beading and seaming that includes bending one of the parts over the other; wherein the roof part is substantially free of welds.

14. The vehicle body of claim 13, wherein the at least one of beading and seaming is combined with one of an adhesive and an adhesive tape.

15. The vehicle body of claim 13, further comprising:
a raised flange extending at least in sections over a length of a joining point and mounted on at least one of the roof part and the lateral roof frame parts, and
wherein the flange is deformed such that a positive-locking, fixed connection to the adjacent component is created.

16. The vehicle body of claim 13, the roof frame parts each having an inner part, a side part and a reinforcing part arranged between the roof part and the lateral roof frame parts, wherein:
the flange is mounted on a region of the side part that faces the respective roof channel, wherein the flange extends at least in sections over the roof channel, and
the flange is at least one of beaded and seamed over an edge of the roof part.

17. The vehicle body of claim 13, further comprising:
two flanges, one flange mounted on a side of the roof frame and one flange mounted on the roof part, the flange provided on the side part being directed obliquely upward and the flange provided on the roof part being directed obliquely downward; wherein the flanges are oriented with respect to one another so as to intermesh, and the flanges are compressed in a positive-locking manner by using a beading tool.

18. The vehicle body of claim 13, further comprising two flanges, one flange mounted on a side of the roof frame and one flange mounted on the roof part, the two flanges being directed upward and one of the two flanges being designed to be longer than the other flange, wherein, when the roof part is placed onto the roof frame, the two flanges are oriented with respect to each other in such a manner that they bear against each other, and wherein, after the roof part is placed onto the roof frame, the longer flange is at least one of beaded and seamed over the shorter flange.

19. The vehicle body of claim 13, further comprising two flanges are mounted, one flange on a side of the roof frame and one flange on the roof part, the two flanges being directed upward and being approximately identical in length; wherein the two flanges are oriented with respect to each other in such a manner that they bear against each other; and the two flanges are at least one of beaded and seamed together to form one side.

\* \* \* \* \*